(12) United States Patent  (10) Patent No.: US 6,635,816 B2
Funaki                    (45) Date of Patent:    Oct. 21, 2003

(54) EDITOR FOR MUSICAL PERFORMANCE DATA

(75) Inventor: Tomoyuki Funaki, Shizuoka-Ken (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 09/837,975

(22) Filed: Apr. 19, 2001

(65) Prior Publication Data

US 2002/0020279 A1 Feb. 21, 2002

(30) Foreign Application Priority Data

Apr. 21, 2000 (JP) ...................................... 2000-120618

(51) Int. Cl.[7] .............................................. G09B 15/00
(52) U.S. Cl. .......................... 84/477 R; 84/609; 84/615
(58) Field of Search .................. 84/600–604, 609–610, 84/615, 634, 649–650, 653, 666, 477 R, 478

(56) References Cited

U.S. PATENT DOCUMENTS

| | | | | |
|---|---|---|---|---|
| 5,723,803 A | * | 3/1998 | Kurakake | ..................... 84/609 |
| 5,952,598 A | * | 9/1999 | Goede | ......................... 84/609 |
| 6,150,598 A | * | 11/2000 | Suzuki et al. | ................. 84/603 |
| 6,281,420 B1 | * | 8/2001 | Suzuki et al. | ............. 84/477 R |
| 6,281,421 B1 | * | 8/2001 | Kawaguchi | ................... 84/603 |
| 6,300,552 B1 | * | 10/2001 | Sato | ............................. 84/604 |
| 6,410,837 B2 | * | 6/2002 | Tsutsumi | ..................... 84/604 |

* cited by examiner

Primary Examiner—Marlon T. Fletcher
(74) Attorney, Agent, or Firm—Harness, Dickey & Pierce, PLC

(57) ABSTRACT

A handy method of editing and reproducing musical performance data. The musical performance data divided into a plurality of sections is edited. Blocks B1, B2, B3 and B4 representative of sections are displayed continuously coupled to each other. A block B is selected by using a pointer P of a mouse. An end of the selected block B (a partitioning position relative to an adjacent block) is dragged with the pointer P to change the length of the selected block (section). At the same time, the length of the adjacent block is automatically changed. In order to facilitate to locate the partitioning position of the block before alteration of the length, an icon is displayed at the original partitioning position. In reproducing the performance data, a start position change switch is activated to move a grid pointer GP to the start of music to reproduce the performance data to the end thereof, if the section is not selected. The start position change switch is activated to move the grid pointer GP to the front end of a section to reproduce the performance data to the back end of the section if the section is designated.

24 Claims, 13 Drawing Sheets

EDITOR FOR MUSICAL PERFORMANCE DATA

CROSS REFERENCE TO RELATED APPLICATION

This application is based on and claims priority to Japanese Patent Application No. 2000-120618, filed on Apr. 21, 2000, the whole contents of which are incorporated herein by reference.

BACKGROUND OF THE INVENTION

1. Field of the Invention

The present invention relates to an editor for musical performance data for editing musical performance data of automatic performance and accompaniment of an electronic musical instrument or the like.

2. Description of the Related Art

In the technical field of electronic musical instruments and computer music, it is known that musical performance data called style data including, for example, pitch data and timing data, is reproduced for automatic accompaniment. Such style data is constituted of a plurality of parts such as percussion instrument parts and other accompaniment parts. A user may write or edit, and reproduce user musical performance data.

Conventionally, the following functions have been provided for editing and reproducing such musical performance data.

(1) Music is partitioned into sections to edit the music by designating musical performance data in the unit of section. On a display window (editor window), blocks corresponding to sections of the performance data are displayed continuously coupled to each other. A function is provided for elongating or shortening the length of each block on the display window in order to change the length of each section, i.e., to move the partitioning position of the performance data.

(2) Another function is to reproduce musical performance data in order to confirm edited results. A reproduction start position is set with a start position change switch and a reproduction start switch is activated so that music can be reproduced, e.g., from the start thereof.

(3) Another function is to manually input start and end positions of music and reproduce a desired section of the music.

(4) Another function is to always recognize a present position corresponding to an input position of musical performance data on the time axis and selected by an operator, and to display the present position as a distance from the start of the music.

(5) Another function is to insert setting information in musical performance data at an arbitrary position, the setting information including a tone color (or timbre) number, a tempo number, a panning (PAN) value and the like. The music can be modified starting from the inserted position in accordance with the setting information.

(6) Another function is to display a block as one section on the display window if the length of the block is elongated or shortened and merged with an adjacent section.

The conventional functions are associated with the following problems.

(1) In changing the length of a section, if the corresponding block only is elongated or shortened, adjacent sections are separated or overlapped. Therefore, in order to move the partitioning position between adjacent sections, both the blocks corresponding to the adjacent sections should respectively be elongated and shortened. This operation is cumbersome.

(2) It is easy to move the reproduction start position to the start position of music by using the start position switch. However, if the reproduction start position is to be moved to the start of an intermediate section, it is necessary to manually set the position by using, for example, a fine backward switch. This operation is cumbersome.

(3) In reproducing a desired section, it is necessary to manually set the reproduction start and end positions to the start and end of the section. This operation is cumbersome.

(4) Since the present position is displayed only as the position from the start of music, it is difficult to understand whether the present position is at which position in what section.

(5) Although the setting information can be inserted into an arbitrary position, if setting is to be inserted in one section, it is necessary to insert it after the start position of the section is searched. This operation is cumbersome.

(6) After the length of a block on the display window is elongated or shortened to combine it with an adjacent block and if this block is to be separated into original blocks, it is necessary to separate this block by checking the details of musical tone events and timings of performance data. This operation is cumbersome, and in some cases, the original blocks cannot be recovered reliably.

SUMMARY OF THE INVENTION

It is an object of the present invention to provide a musical performance data editor capable of providing handy generating and editing musical performance data.

Performance data of music is divided into a plurality of sections to allow performance data to be edited in each section. Display elements each having a configuration corresponding to a length of each section of the performance data are displayed continuously coupled each other. When the configuration of a selected display element is changed, the length of a corresponding section of the performance data is changed and the configuration of a display element of a section of the performance data adjacent to the section whose length of the performance data was changed is changed correspondingly.

At the same time when the configuration such as a block of a display element corresponding to a selected section is changed, the configuration of the display element of an adjacent section is changed. The length of the section in the performance data is also changed. Accordingly, the section can be easily changed. The configuration of a display element can be changed by using a pointing device such as a mouse.

It is preferable that as the end of the selected display element is pointed and moved on the display window, the end and an end of a display element adjacent to the end of the selected display element are moved at the same time to change lengths of both the display elements. Since the configuration of the display element is changed, a change in the section can be easily confirmed so that it is easy to use the musical performance data editor.

As the end of the selected display element is pointed and moved on the display window, the end and an end of a display element adjacent to the end of the selected display element are moved at the same time to change lengths of both the display elements. If the selected and changed display element includes therein an adjacent display element totally, the included display element is deleted and the length of a next adjacent display element is also changed.

As the end of the displayed element is pointed and moved, the configurations of the display elements of both the corresponding section and the adjacent section are changed so that a change in the section can be easily confirmed and it is easy to use the musical performance data editor. Further, if the selected and changed section includes therein an adjacent section totally, the length of the next adjacent section can also be changed.

According to another aspect of the present invention, there is provided a musical performance data editing apparatus capable of setting a present position of performance data of music on a time axis and capable of editing the performance data of the music in each section among a plurality of sections of the music, comprising: a memory capable of storing the performance data; a display unit capable of displaying each section of the music; an operator capable of designating each section of the music on the display unit; a present position change switch for changing the present position in the music; and a controller for, when the present position change switch is operated, setting the present position to a start of a whole of the music if the section has not been designated, or if a section has been designated, setting the present position to an end of the designated section.

As the present position change switch is operated, the present position is set to the end position of a whole of the music if the section has not been designated, or if a section has been designated, the present position is set to the end position of the designated section. The end position is either the start or end position of the whole of the music, or either the front or back end position of the section. The present position change switch may be a start position move switch for setting the present position to the start end or front end position or an end position move switch for setting the present position to the end or back end position. The present position can be recognized also as the reproduction start position during the reproduction process so that the reproduction operation from the front end of the section becomes easy.

According to another aspect of the present invention, there is provided a musical performance data editing apparatus capable of editing performance data of music in each section among a plurality of sections of the music, comprising: a memory capable of storing the performance data; a display unit capable of displaying each section of the music; an operator capable of designating each section of the music on the display unit; a reproduction start switch; and a controller for, when the reproduction start switch is operated, reproducing the performance data to an end of the music if the section is not designated, or if a section is designated, reproducing the performance data of the designated section to a back end of the section.

After the performance data is reproduced to the end of the music, the reproduction data may be reproduced again starting from the start of the music.

According to another aspect of the invention, there is provided a musical performance data editing apparatus capable of setting a present position of performance data of music on a time axis and capable of editing the performance data of the music in each section among a plurality of sections of the music, comprising: a memory capable of storing the performance data; a display unit capable of displaying each section of the music; an operator capable of designating each section of the music on the display unit; an operator capable of designating the present position in the music on the display unit; and a controller capable of displaying information of the present position as information of a position in a section including the present position.

Since the present position can be displayed as the information of a position in the section including the present position, the present position can easily be confirmed.

According to another aspect of the present invention, there is provided a musical performance data editing apparatus capable of editing performance data of music in each section among a plurality of sections of the music, comprising: a memory capable of storing the performance data; a display unit capable of displaying each section of the music; an operator capable of designating each section of the music on the display unit; an operator capable of inputting new setting information; and a controller for, when the setting information is input after the section is designated, recording the setting information at a position before a first tone event in the designated section.

By simply designating a section and inputting setting information, the setting information can be recorded at the front end position of the designated section or at the back end position of the preceding section. It is therefore easy to set the setting information for each section.

According to another aspect of the invention, there is provided a musical performance data editing apparatus capable of editing performance data of music in each section among a plurality of sections of the music, comprising: a memory capable of storing the performance data; a display unit capable of displaying each section of the music; an operator capable of designating each section of the music on the display unit; and a controller for displaying display elements each having a configuration corresponding to a length of each of the plurality of sections continuous in a time domain, on a display window, the display elements being sequentially coupled to each other on the display window and changing the configuration of a selected display element to change a length of a corresponding section of the performance data and display a partitioning position at a position corresponding to a partitioning position of the section before alteration of the length thereof.

As the configuration of the display element corresponding to the selected section is changed, the length of the adjacent section is also changed. Therefore, the section can be easily changed and since it is possible to easily confirm the partitioning position before alteration, the original state can be easily recovered.

According to another aspect of the present invention, there is provided a musical performance data editing method capable of editing performance data of music in each section among a plurality of sections of the music, the method comprising the steps of: displaying display elements each having a configuration corresponding to a length of each of a plurality of sections continuous in a time domain, on a display window, the display elements being sequentially coupled to each other on the display window; and changing the configuration of a selected display element to change a length of a corresponding section of the performance data and change the configuration of a display element and a length of a section of the performance data adjacent to the section whose length of the performance data was changed, in accordance with a change amount of the selected display element.

According to another aspect of the present invention, there is provided a musical performance data editing program to be executed by a computer and being capable of editing performance data of music in each section among a plurality of sections of the music, the program comprising the procedures of: displaying display elements each having a configuration corresponding to a length of each of a plurality of sections continuous in a time domain, on a display window, the display elements being sequentially coupled to each other on the display window; and changing the configuration of a selected display element to change a length of a corresponding section of the performance data and change the configuration of a display element and a length of a section of the performance data adjacent to the section whose length of the performance data was changed, in accordance with a change amount of the selected display element.

As the length of the selected section is changed, the length of the adjacent section is also changed at the same time. It is therefore easy to change the section and to generate and edit performance data.

As the end of a display element is pointed and moved, the configurations of the display elements of both the selected section and the adjacent section can be changed. It is therefore easy to confirm a change of the section and use the musical performance data editor.

As the end of a display element is pointed and moved, the lengths of the selected section and the adjacent section are changed. It is therefore easy to confirm a change of the section and use the musical performance data editor. In addition, if the selected section includes therein an adjacent section totally, the length of the next adjacent section can be changed.

By activating the present position change switch, the present position can be set to either the end position of music or a desired position of a section. It is therefore easy to generate and edit performance data.

Information of the present position is displayed as the information of a position in the section including the present position. The present position can therefore be easily confirmed and it becomes easy to generate and edit performance data.

By simply designating a section and inputting setting information, the setting information can be recorded at the front end position of the designated section or at the back end position of the preceding section. It is therefore easy to set the setting information for each section and to generate and edit performance data.

The present setting information of a designated one of sections can be confirmed as it is.

Even if the length of a section is changed, the partitioning position before alteration of the length can be easily confirmed. Therefore, the previous state can be recovered with ease and it becomes easy to generate and edit performance data.

DETAILED DESCRIPTION OF THE PREFERRED EMBODIMENTS

Figure 13:
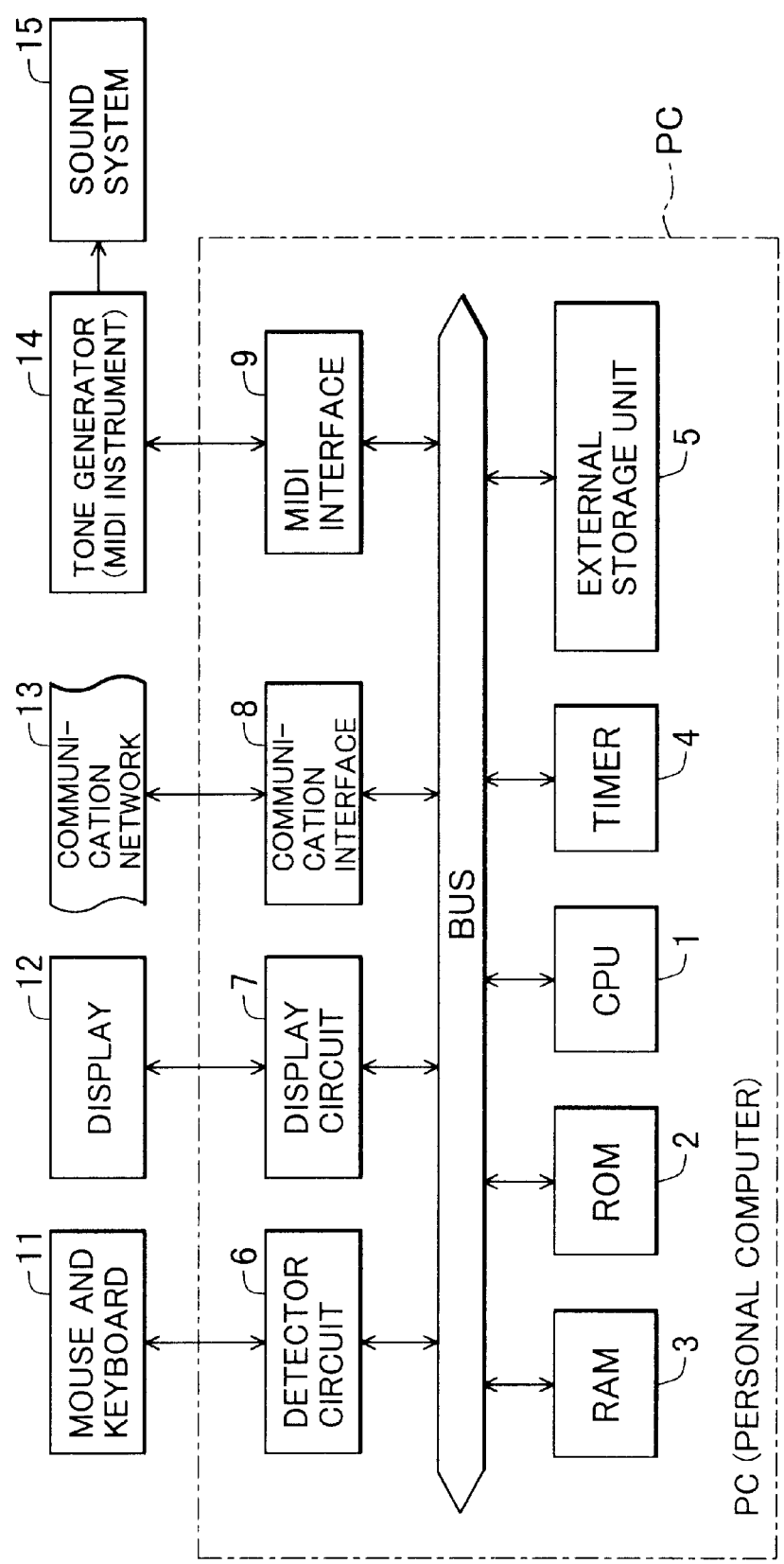
FIG. 13 is a block diagram of a musical performance data editor structured by a personal computer and software.

An embodiment of the invention will be described with reference to the accompanying drawings. FIG. 13 is a block diagram of a musical performance data editor structured by a personal computer and software. The personal computer PC has a CPU 1, a ROM 2, a RAM 3, a timer 4, an external storage unit 5, a detector circuit 6, a display circuit 7, a communication interface 8 and a MIDI interface 9.

The detector circuit 6 is an input interface via which an operation event of a keyboard and mouse 11 is input. The display circuit 7 corresponds to a video card, a video chip and the like, and controls a display unit 12. The communication interface 8 communicates with a server computer or the like via a communication network 13 such as a local area network (LAN), the Internet, and a telephone line. The MIDI interface 9 communicates with a tone generator (MIDI instrument) 14 and outputs MIDI data to the tone generator 14 when user performance data and style data are reproduced. The tone generator 14 operates to produce musical sounds via a sound system 15. A timer 4 is used for generating interrupt signals for reproduction/record interrupt processes, various clock signals for an interrupt process of detecting a keyboard operation event, and other control signals.

CPU 1 performs usual controls under an operating system (OS) installed, for example, in a disc of an external storage unit 5 such as a hard disc drive (HDD) by using working areas of RAM 3. Specifically, CPU 1 performs a display control of the display unit 12, receives data corresponding to an operation of the keyboard and mouse 11, controls the display position of a mouse pointer (cursor) on the display unit 12, detects a click operation of the mouse, and executes other controls. An input setting operation and the like entered by a user can be performed through a process of so-called graphical user interface (GUI) by using a display operation on the display unit 12 and a mouse operation.

The external storage unit 5 may be a floppy disc drive (FDD), a hard disc drive (HDD), a magneto optical disc (MO) drive, a CD-ROM drive, a digital versatile disc drive (DVD) or the like. For example, the external storage unit 5 supplies a musical performance data editing program, and is used for storing user performance data and as databases for storing music template data and style data, the music template data being used as fundamental data for generating user performance data.

Various data such as performance data editing programs, music template data and style data may be distributed from a server computer via the communication interface 8 connected to the communication network 13.

In this embodiment, musical performance data editing programs, music template data and style data are stored in a disc of the external storage unit 5 such as a hard disc drive (HDD). CPU 1 develops the performance data editing program in HDD onto RAM 3 and controls a performance data editing process in accordance with the program stored in RAM 3.

Figure 8:
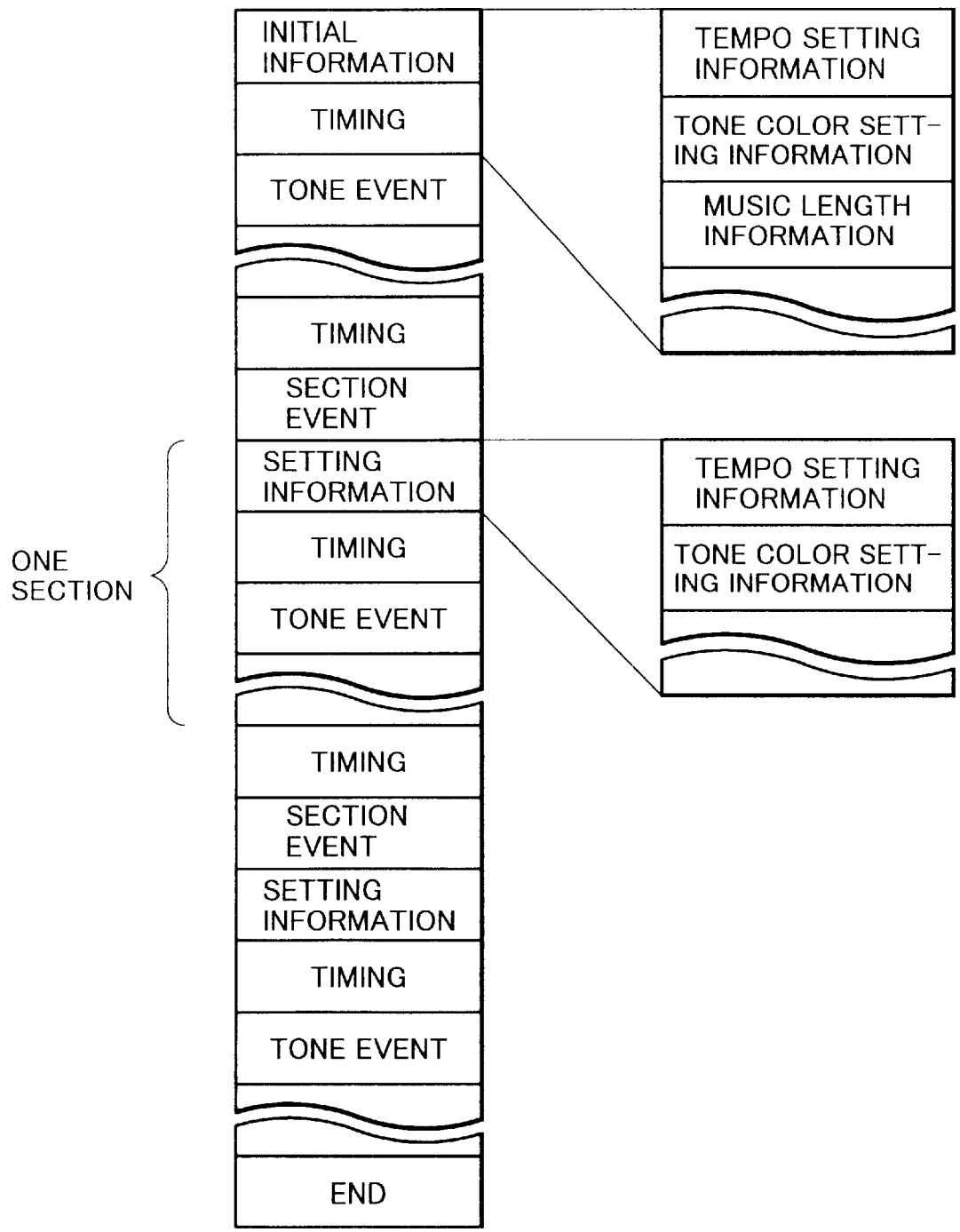
FIG. 8 is a diagram showing an example of the format of musical performance data according to the embodiment.

FIG. 8 is a diagram showing an example of the format of performance data according to the embodiment. Performance data shown in FIG. 8 corresponds to one part (e.g., melody part) among music reproduction data composed of a user. Performance data of a piece of music is constituted of: a plurality of parts such as a melody part, an accompaniment part and a percussion part; a style sequence representative of time sequential data of an accompaniment style; a code sequence representative of code progression; and the like. In the following description of the embodiment, one part is used.

As shown in FIG. 8, performance data includes: initial information recorded at the start thereof including tempo setting information, tone color setting information, music length information and the like; timing information and tone event information sequentially recorded after the initial information; and end data recorded at the last thereof. Section event data indicating a section partitioning position together with timing data indicating a partitioning position in the performance data (timing of an address immediately before the section event) is also recorded. Namely, data from the start of music to the first section event (and its timing) corresponds to data of the first section, data between two adjacent section events (and their timings) corresponds to data of each of the following sections, and data between the last section event and end data corresponds to data of the last section. After each section event, setting information including tempo setting information, tone color (or timbre) information and the like is recorded. This setting information is recorded when it is input to this section, whereas if it is not input, this information is not recorded.

The timing of each event in the performance data is based upon a clock having a predetermined resolution, for example, 40 clocks per one measure length. Each position on the time axis having a minimum resolution corresponding to this clock is called a "grid", and a presently selected position such as a reproduction start position and data input position is called a "present position".

Figure 1:
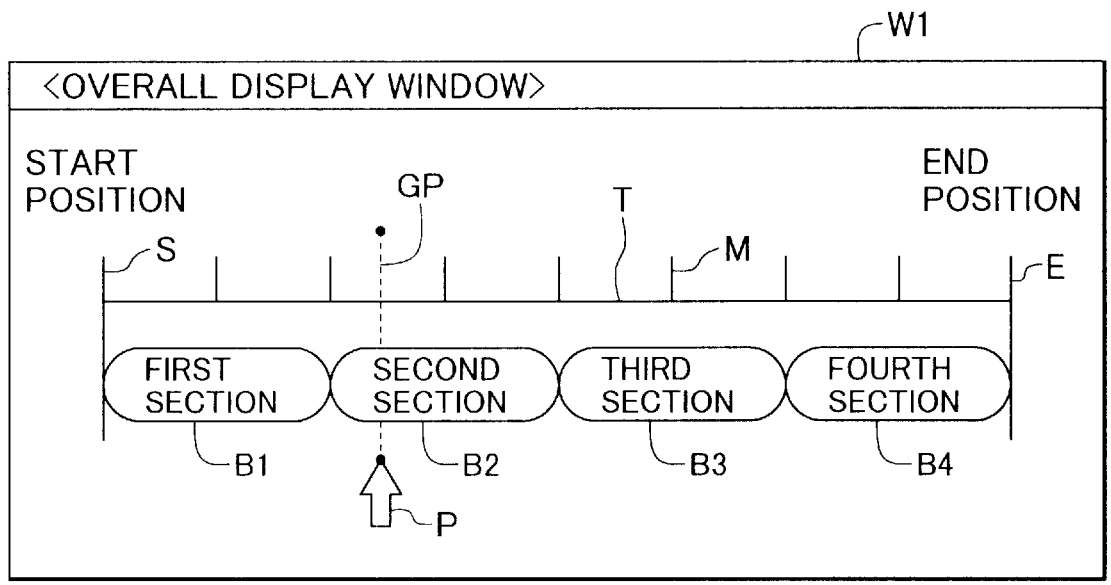
FIG. 1 is a diagram showing an example of the overall display window according to an embodiment of the invention.
Figure 2:
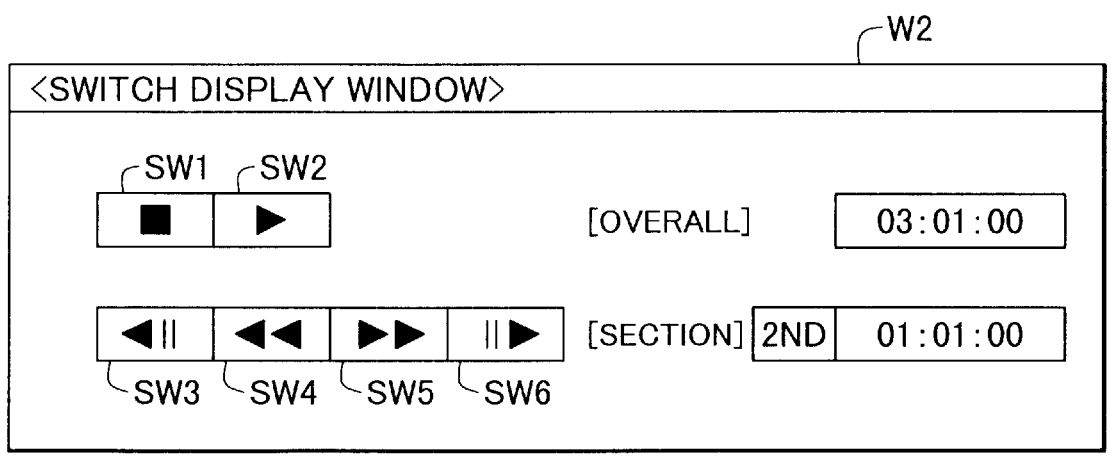
FIG. 2 is a diagram showing an example of a switch display window according to the embodiment.
Figure 3:
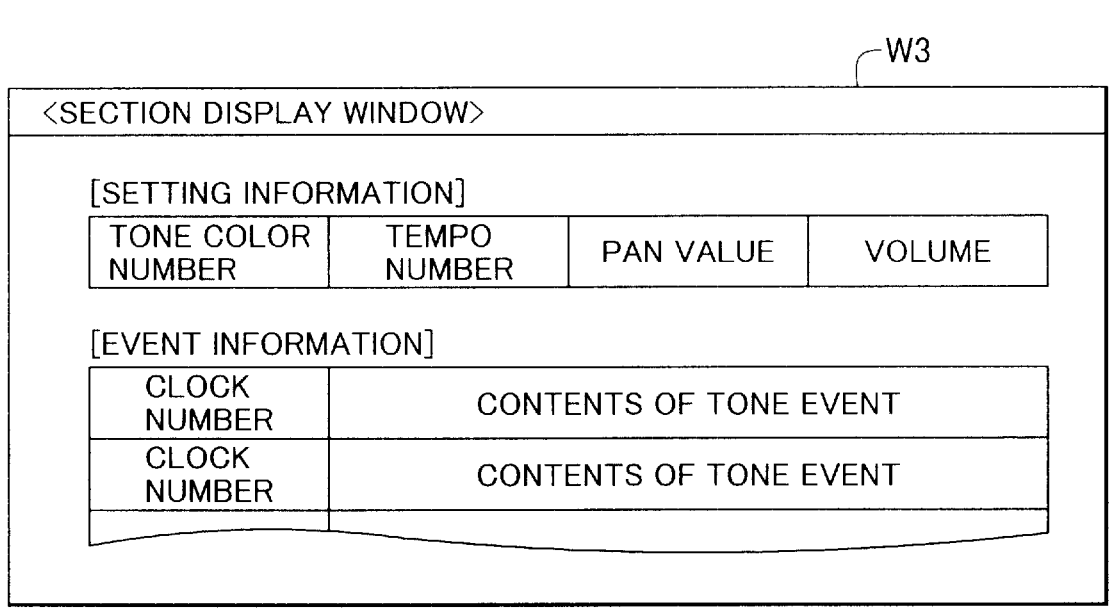
FIG. 3 is a diagram showing an example of a section display window according to the embodiment.

FIGS. 1 to 3 are diagrams showing examples of display windows during editing and generating processes of musical performance data. The display windows shown in FIGS. 1 and 2 are displayed at the same time when performance data (during generation or after generation) is selected on an unrepresented initial display window.

Displayed on an overall display window W1 shown in FIG. 1 are a time axis T corresponding to a flow of performance data, a start line S indicating the start (head) position of music, an end line E indicating the end position of music, a measure line M. Blocks B1, B2, B3 and B4 (display elements having a configuration corresponding to the length of each section) are displayed between the start line S and end line E to have a configuration of an ellipsoidal bar representative of each section of the musical performance data. In the following description, it is assumed that initial performance data is divided into first to fourth, four sections which are displayed on the display unit as the blocks B1, B2, B3 and B4. If each block is not necessary to be distinguished from other blocks, it is represented by a symbol "B". Each section may be a sentence section such as introduction, main, fill-in and ending of musical performance data, a code section, a key section, a tempo section, a tone color section and the like. A user can partition performance data as desired.

A grid pointer GP is displayed crossing the time axis T, the grid pointer indicating the present position of the performance data on the time axis. A pointer P of an arrow shape is also displayed to designate a point on the display window by clicking the mouse. The example shown in FIG. 1 shows the state that the grid pointer GP was set to the present position of the pointer P as the mouse was clicked at the position of the pointer P. As the top end of the pointer P is moved to a block B and the mouse is clicked, the block (section) B is selected. The selected block is displayed, for example, by reversing black and white colors.

The switch display window W2 shown in FIG. 2 displays switches including a reproduction stop switch SW1, a reproduction start switch SW2, first present position change switches which are a start position change switch SW3, a fine rewind switch SW4 and a fine fast forward switch SW5, and a second present position change switch which is an end position change switch SW6. "Overall" together with "03:01:00" indicating the present position in the overall range of music is displayed, and "Section" together with "second" and "01:01:00" indicating the present section and the present position in the section including the present position is displayed. In this embodiment, information of the present position is displayed by using a measure number, a beat number and a clock number. In the example shown in FIG. 2, the present position in the whole range of music is at the third measure, the first beat and one clock, the present position in the section is at the second section, the first measure, the first beat and zero clock.

In this embodiment, although information of the present positions in both the whole range and in the section is displayed at the same time, information of the present positions may be selectively displayed.

On a section display window W3 shown in FIG. 3, the details (setting information and event information) of performance data in the presently selected section are displayed. The setting information includes a tone color number (program change or the like) as tone color setting information, a tempo number, a pan (panning) number as tone image orientation information, and a volume (channel volume or the like) as volume information. If the setting information was input to the start of a presently selected section, the setting information is displayed, whereas if the setting information is not input to the start of a presently selected section, the setting information in the preceding section is displayed. The event information includes the number of clocks from the start of music, i.e., timing data, and the contents of a tone event at that timing. As the setting information is input on the section display window W3, the setting information is set to the section and stored at the start of the section as shown in FIG. 8. Instead of the example shown in FIG. 8, the setting information may be stored at the end of the preceding section, i.e., before the timing data of the section event indicating the start of the section corresponding to the setting information, so long as the setting information is recorded before the first tone event in the section.

Figure 4A:
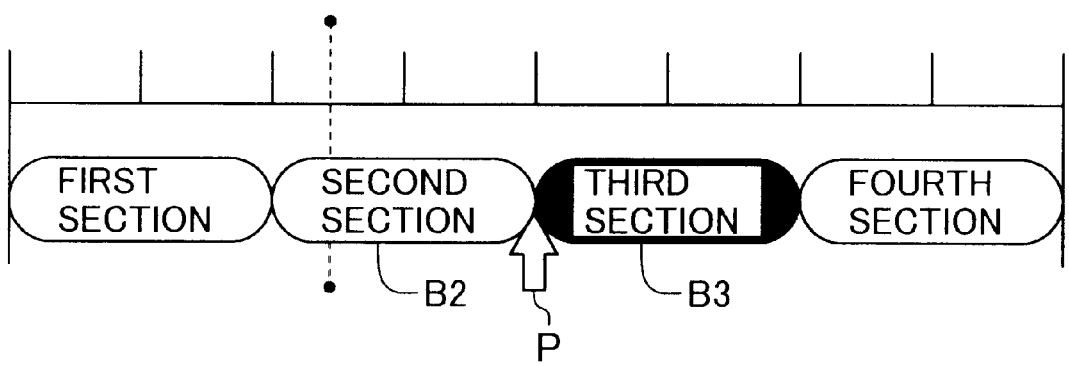
FIGS. 4A and 4B are diagrams showing a first example of display windows during a section elongating/shortening operation according to the embodiment.
Figure 4B:
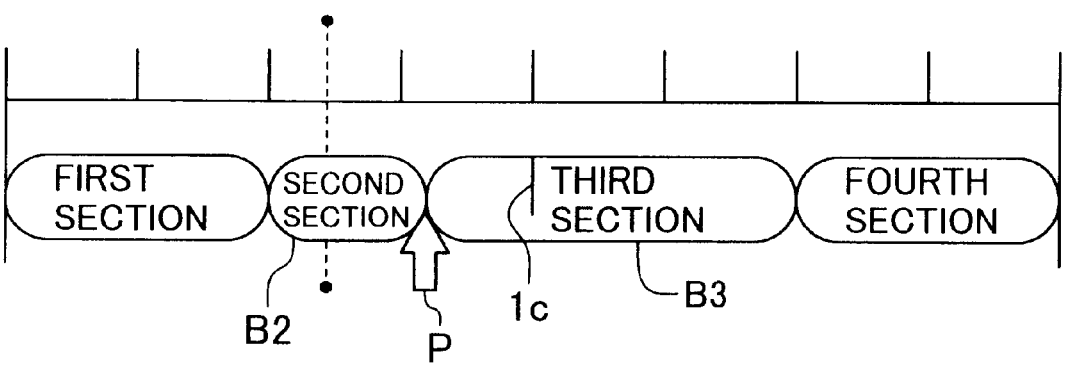

Next, an editing operation and an example of its display window will be described. FIGS. 4A and 4B and FIGS. 5A and 5B are diagrams showing the display windows used when a section is elongated or shortened. FIGS. 4A and 4B illustrate an example of elongating the third section toward the start of music. As shown in FIG. 4A, the block B3 displaying the third section is selected and black and white colors are reversed. In this state, the mouse is operated to move the pointer P to the front end (border with the block B2) of the block B3, clicked and dragged to the left. As shown in FIG. 4B, the block B3 is elongated forward and the block B2 (second section) is shortened correspondingly. At the time when the drag of the mouse is released at a desired position, the partitioning position between the blocks B3 and B2 is established. After the partitioning position is established, the timing data at the grid corresponding to the partitioning position, the section event and block B3 setting information are recorded (inserted) in the position corresponding to the timing at the newly set partitioning position. At the same time, the section event corresponding to the section before alteration and the block B3 setting information (and timing data) are deleted.

As shown in FIG. 4B, at the partitioning position before alteration in the elongated block B3, a partitioning position icon Ic is displayed to indicate the old partitioning position. Therefore, in the state shown in FIG. 4B, as the block B2 is selected and its back end is dragged to the position of the partitioning position icon Ic, the block B2 is elongated backward and the block B3 is shortened correspondingly so that the original partitioning position can be recovered with ease. Also in this case, it is obvious that the section event, block B3 setting information and corresponding timing data after alteration are newly recorded and those before alteration are deleted. In the above operation, the selected block B is elongated. An operation similar to the above-described operation of dragging the partitioning position can also be used to shorten the selected block B. The operation of selecting the block B may be omitted. In this case, only an operation of dragging a desired partitioning position allows the lengths of blocks B on both sides of the partitioning position to be automatically changed.

Figure 5A:
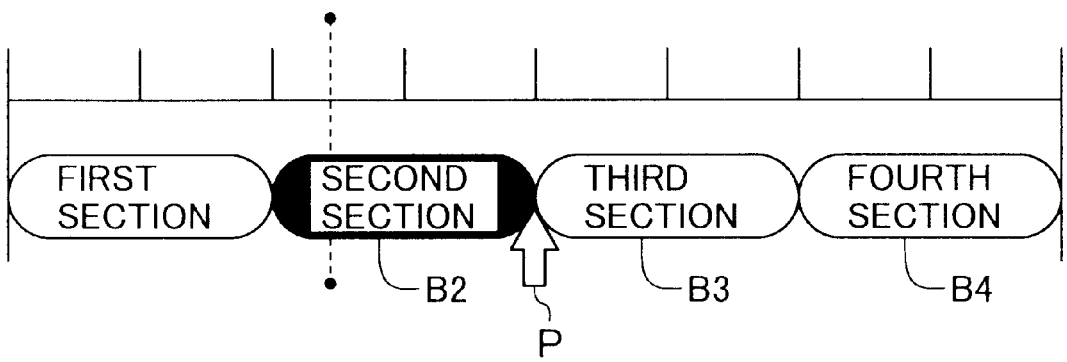
FIGS. 5A and 5B are diagrams showing a second example of display windows during a section elongating/shortening operation according to the embodiment.
Figure 5B:
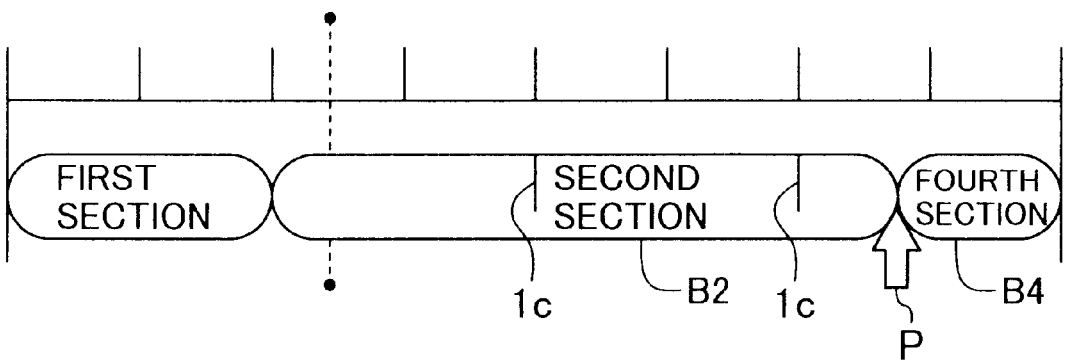

FIGS. 5A and 5B illustrate an example wherein the second section is elongated backward to contain the whole third section. As shown in FIG. 5A, the block B2 displaying the second section is selected and black and white colors are reversed. In this state, the mouse is operated to move the pointer P to the back end of the block B2, clicked and dragged to the right. As shown in FIG. 5B, as the mouse is dragged traversing the block B3 and to the block B4, the block B3 is deleted and the block B4 displaying the third section is shortened correspondingly. At the time when the drag of the mouse is released at a desired position in the block B4, the partitioning position between the blocks B2 and B4 is established. In correspondence to this newly set partitioning position, the section event, block B setting information and corresponding timing data are stored. The section event, setting information and timing data at the partitioning position between the second and third sections before alteration and at the partitioning position between the third and fourth sections before alteration are deleted. Also in this case, the partitioning position icons Ic are displayed at the deleted partitioning positions.

FIGS. 6A and 6B and FIGS. 7A and 7B are diagrams showing the display windows used for the reproduction operation of performance data.

Figure 6A:
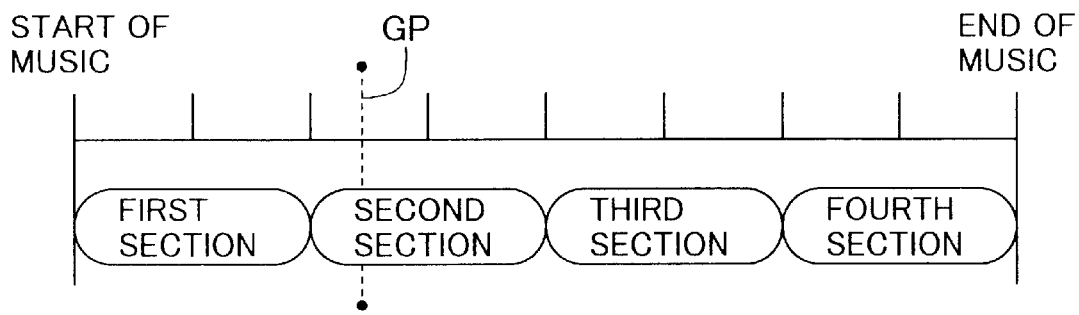
FIGS. 6A and 6B are diagrams showing an example of display windows during a reproducing operation of the whole of music according to the embodiment.
Figure 6B:
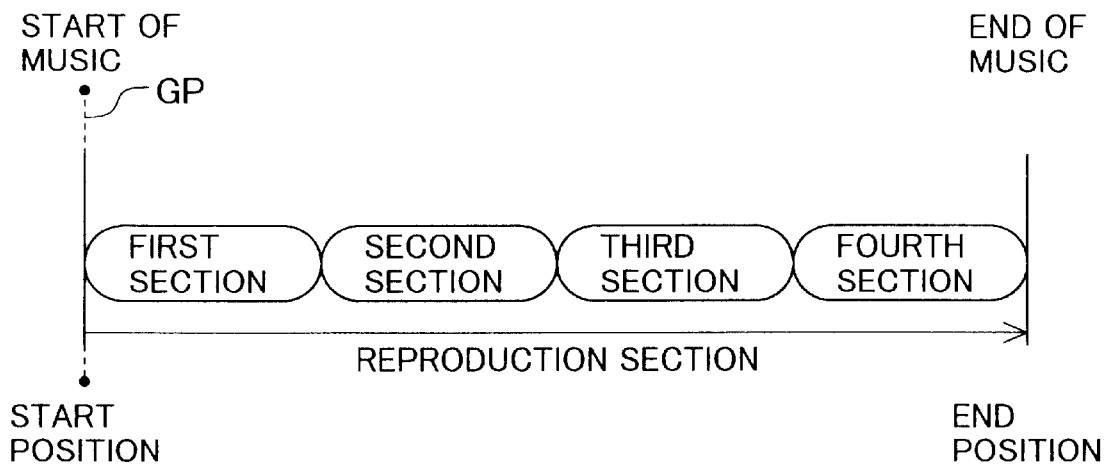

FIGS. 6A and 6B are the diagrams showing display windows used for the reproduction operation without section designation. In the state shown in FIG. 6A, as the start position change switch SW3 on the switch display window W2 shown in FIG. 2 is activated, the grid pointer GP moves to the start of music as shown in FIG. 6B and this start of music becomes the present position. As the reproduction start switch SW2 on the switch display window W2 shown in FIG. 2 is activated, performance data of music is reproduced from the start to end of the music and the performance is automatically stopped at the end of the music.

Figure 7A:
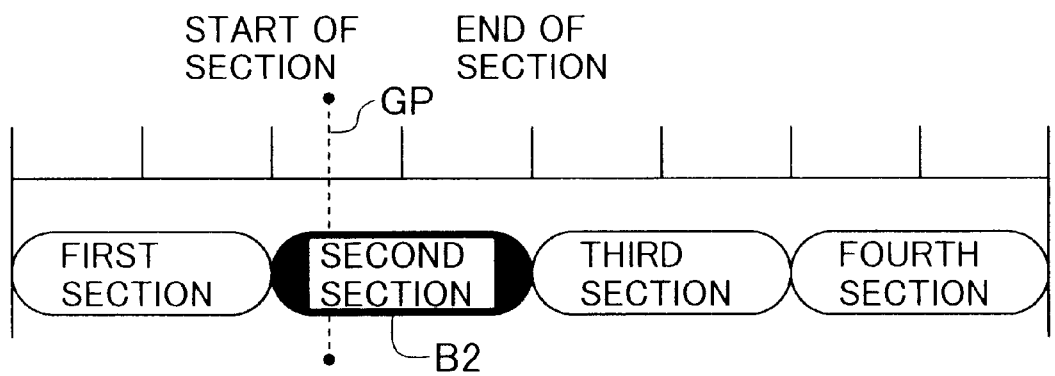
FIGS. 7A and 7B are diagrams showing an example of display windows during a reproducing operation of only a section of music according to the embodiment.
Figure 7B:
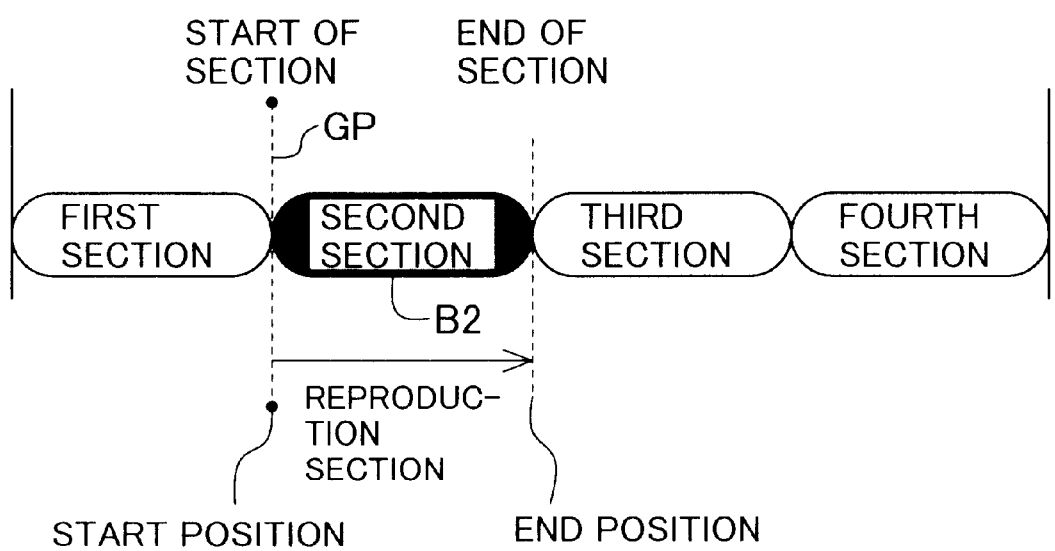

FIGS. 7A and 7B are the diagrams showing display windows used for the reproduction operation with section designation. As shown in FIG. 7A, the second block B2 for the second section is selected (clicked with the mouse), and in this state as the start position change switch SW3 (FIG. 2) is activated, the grid pointer GP moves to the front end of the selected block B2 (second section) as shown in FIG. 7B. This front end of the block B2 becomes the present position. As the reproduction start switch SW2 (FIG. 2) is activated, performance data is reproduced from the front end to back end of the second section and the performance is automatically stopped at the back end of this section.

In the above operation, the start position change switch SW3 as the first present position change switch is used by way of example. If the end position change switch SW6 as the second present position change switch is activated, the grid pointer GP moves to the end of music if a section is not designated, whereas it moves to the back end of a section if the section is designated. These switches may be activated during the reproduction.

FIGS. 9 to 12 are flow charts illustrating the main part of a performance data editing program to be executed by CPU 1. The control operation by CPU 1 will be described with reference to each of the flow charts. The overall process shown in FIG. 9 starts when an existing song or performance data is selected or when it is instructed to generate new performance data. First, at Step S1 an initialization process is executed to display the overall display window W1 such as shown in FIG. 1 and the switch display window W2 such as shown in FIG. 2 and to execute a reset process of resetting various flags and buffers. Thereafter, the flow advances to Step S2. In the display process for the overall display window, the overall display window (display window including blocks B and the like) based upon selected performance data is displayed when the already generated performance data is selected, or the overall window based upon generated performance data is displayed when the performance data is newly generated.

Figure 10:
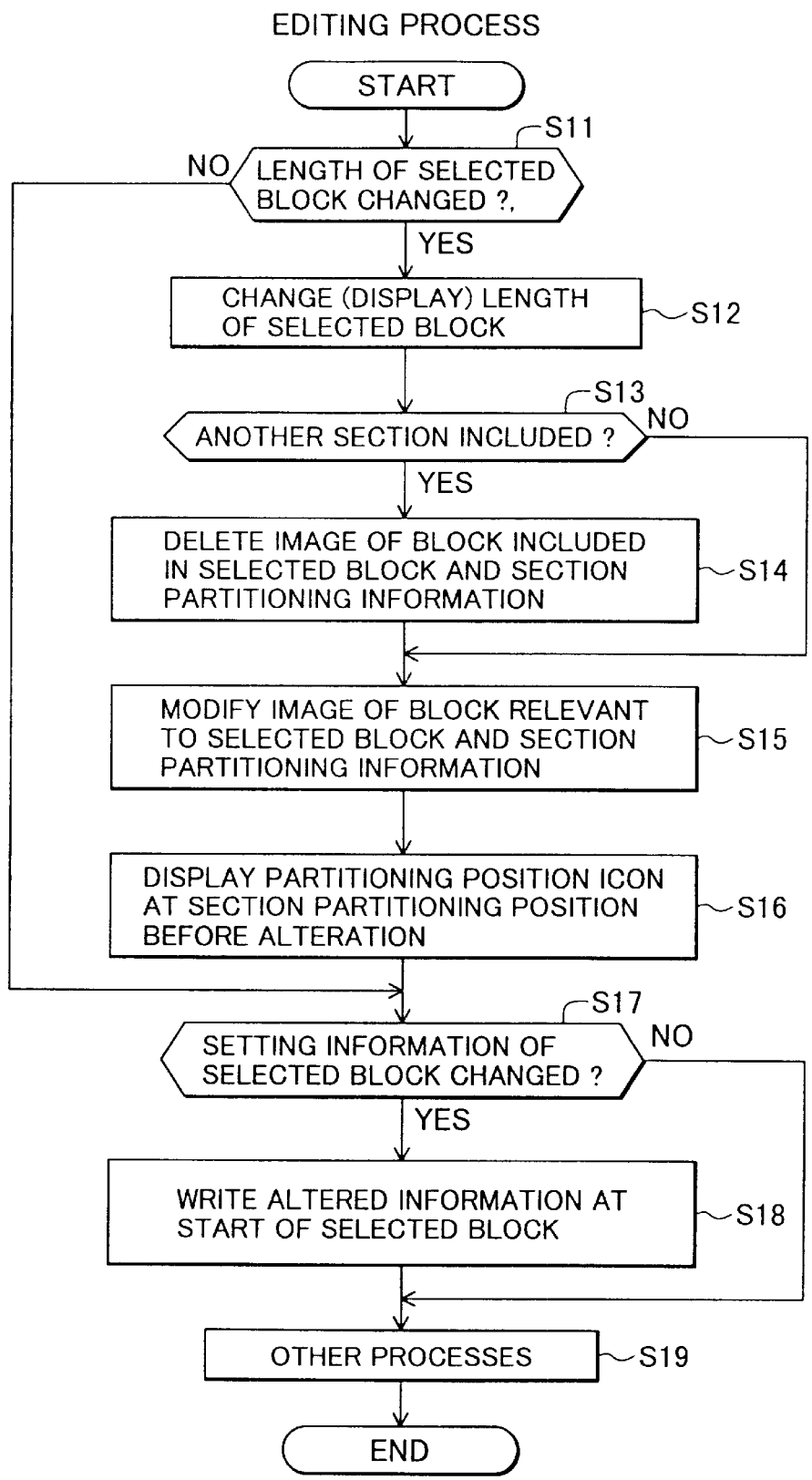
FIG. 10 is a flow chart illustrating an editing process according to the embodiment.
Figure 12:
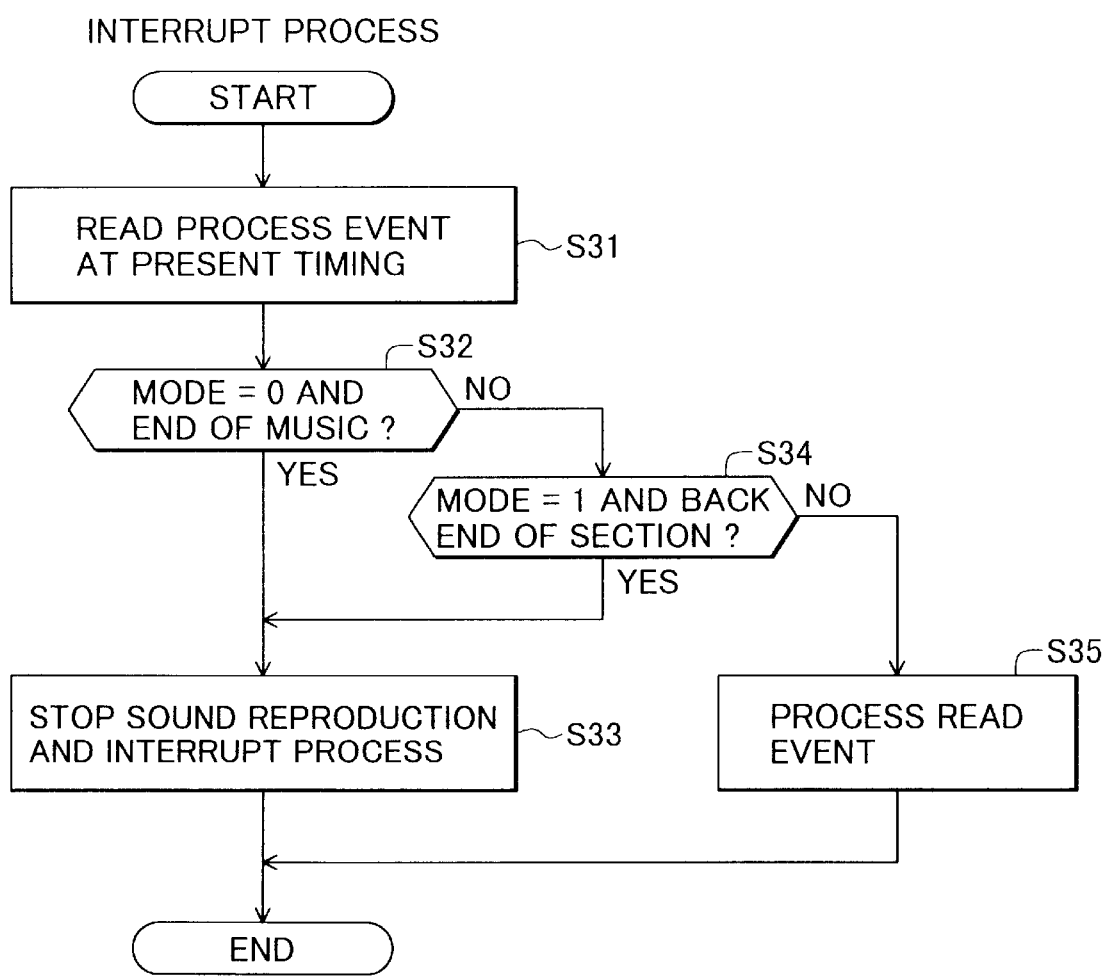
FIG. 12 is a flow chart illustrating an interrupt process according to the embodiment.

At Step S2 it is checked from a presence/absence of an activation of the start position change switch SW3 whether there is an instruction of moving to the start of music. If not, the flow skips to Step S4, whereas if there is an instruction, at Step S3 the position of the grid pointer GP is moved to the start of music and a reproduction start position pointer for the reproduction process is moved (set) to the start of performance data, as shown in FIG. 6B. Next, at Step S4 an editing process shown in the flow chart of FIG. 10 is executed, and at Step S5 it is checked from a presence/ absence of an activation of the reproduction start switch SW2 whether there is an instruction of starting reproduction. If not, the flow skips to Step S7, whereas if there is an instruction, at Step S6 a MODE flag is set to "0" and an interrupt process shown in the flow chart of FIG. 12 is activated to thereafter advance to Step S7. The MODE flag indicates whether the whole of music is reproduced or only a designated section is reproduced. If the MODE flag is "0", the whole of music is reproduced, whereas if it is "1", only the designated section is reproduced.

At Step S7 it is checked whether there is an instruction of starting a section process, in accordance with whether a section is selected on the overall display window WI (more specifically, whether a block B is clicked). If any section is not selected and there is no instruction of starting the section process, then at Step S9 other processes are executed. At Step S10 it is checked whether the overall process is completed. If not completed, the flow returns back to Step S2, whereas if completed, the overall process is terminated.

In the other processes at Step S9, the following processes are executed. In response to an activation of the fine rewinding switch SW4 or fast forward switch SW5, a process of changing the display position of the grid pointer GP and the reproduction start position to the designated position (the designated position can be moved from the start to end of music) is carried out. In response to an activation of the reproduction stop switch SW1, a stop process is executed to mute sounds and execute the interrupt process. In response to an activation of the end position change switch SW6, the display position of the grid pointer GP and the reproduction start position are changed to the end of music. In response to selection/generation of new performance data, the overall display window is changed and a termination process for the displayed section display window W3 is executed.

Figure 11:
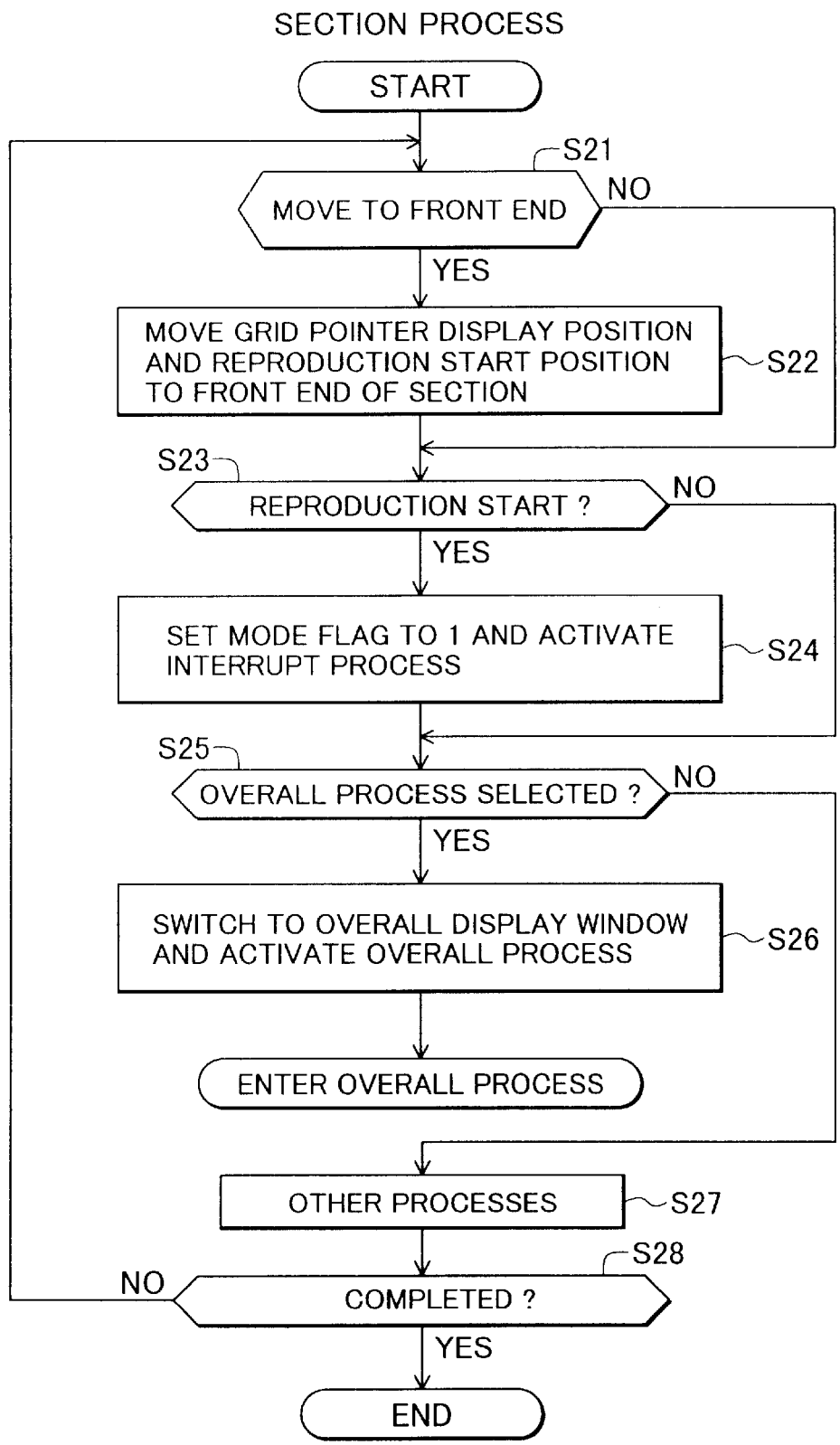
FIG. 11 is a flow chart illustrating a section process according to the embodiment.

If a section is selected and there is an instruction of starting the section process at Step S7, then at Step S8 the section display window W3 corresponding to the selected section is displayed and the section process shown in the flow chart of FIG. 11 is activated to execute the section process shown in FIG. 11 to be described later.

In the editing process shown in FIG. 10, at Step S11 in accordance with the position of the pointer P and an operation state of the mouse, it is checked whether there is an operation of changing the length of the selected block B. If not, the flow skips to Step S17, whereas if there is a change operation, the length of the selected block B is changed (displayed) at Step S12 in accordance with the change operation. At Step S13 it is checked whether the block B includes therein another block. Including therein another block corresponds to, for example, the case that the block B2 contains the whole of the third section (block B3) because of the operation shown in FIGS. 5A and 5B. If the block B does not include another block, the flow skips to Step S15, whereas if it includes, at Step S14 an image of the block B included in the selected block B and section partitioning information are deleted. For example, in the example shown in FIGS. 5A and 5B, the section event, setting information and timing data at the start of the third section are deleted. Thereafter, the flow advances to Step S15.

At Step S15 a block adjacent to the selected block B is processed. This adjacent block corresponds to the third section shown in FIGS. 4A and 4B and the fourth section shown in FIGS. 5A and 5B. Namely, the display and section partitioning information of the block adjacent to or contained in the selected block are modified. For example, in the example shown in FIGS. 4A and 4B, the section event, setting information and timing data corresponding to the start of the third section are deleted from the performance data, and the section event, setting information and timing data of the third section are recorded in the performance data at the position corresponding to the pointer P shown in FIG. 4B. In the example shown in FIGS. 5A and 5B, the section event, setting information and timing data corresponding to the start of the fourth section are deleted from the performance data, and the section event, setting information and timing data of the fourth section are recorded in the performance data at the position corresponding to the pointer P shown in FIG. 5B.

Next, at Step S16 the partitioning position icon or icons IC are displayed at the section partitioning position or positions before alteration (refer to FIGS. 4A and 4B and FIGS. 5a and 5b) to thereafter advance to Step S17. At Step S17 in accordance with a presence/absence of an input of setting information on the section display window W3 (FIG. 3), it is checked whether there is a change in the setting information of the selected block. If not, the flow skips to Step S19, whereas if there is a change, at Step S18 altered setting information is written at the start of the selected block (section) as shown in FIG. 8 to thereafter advance to Step S19. At Step S19 a process of deleting the block (section), re-partitioning the block and other processes are executed to thereafter return to the original routine.

The section process shown in FIG. 11 is executed after the section display window W3 is displayed. First, at Step S21 in accordance with a presence/absence of an activation of the start position change switch SW3, it is checked whether there is an instruction of moving to the front end. If not, the flow skips to Step S23, whereas if there is an instruction, at Step S22 the display position of the grid pointer GP is moved to the front end of the section and the reproduction start position pointer for the reproduction process is moved (set) to the front end of the section, as shown in FIG. 7B. Next, at Step S23 it is checked from presence/absence of an activation of the reproduction start switch SW2 whether there is an instruction of starting reproduction. If not, the flow skips to Step S25, whereas if there is an instruction, at Step S24 the MODE flag is set to "1" and the interrupt process shown in the flow chart of FIG. 12 is activated to thereafter advance to Step S25.

Figure 9:
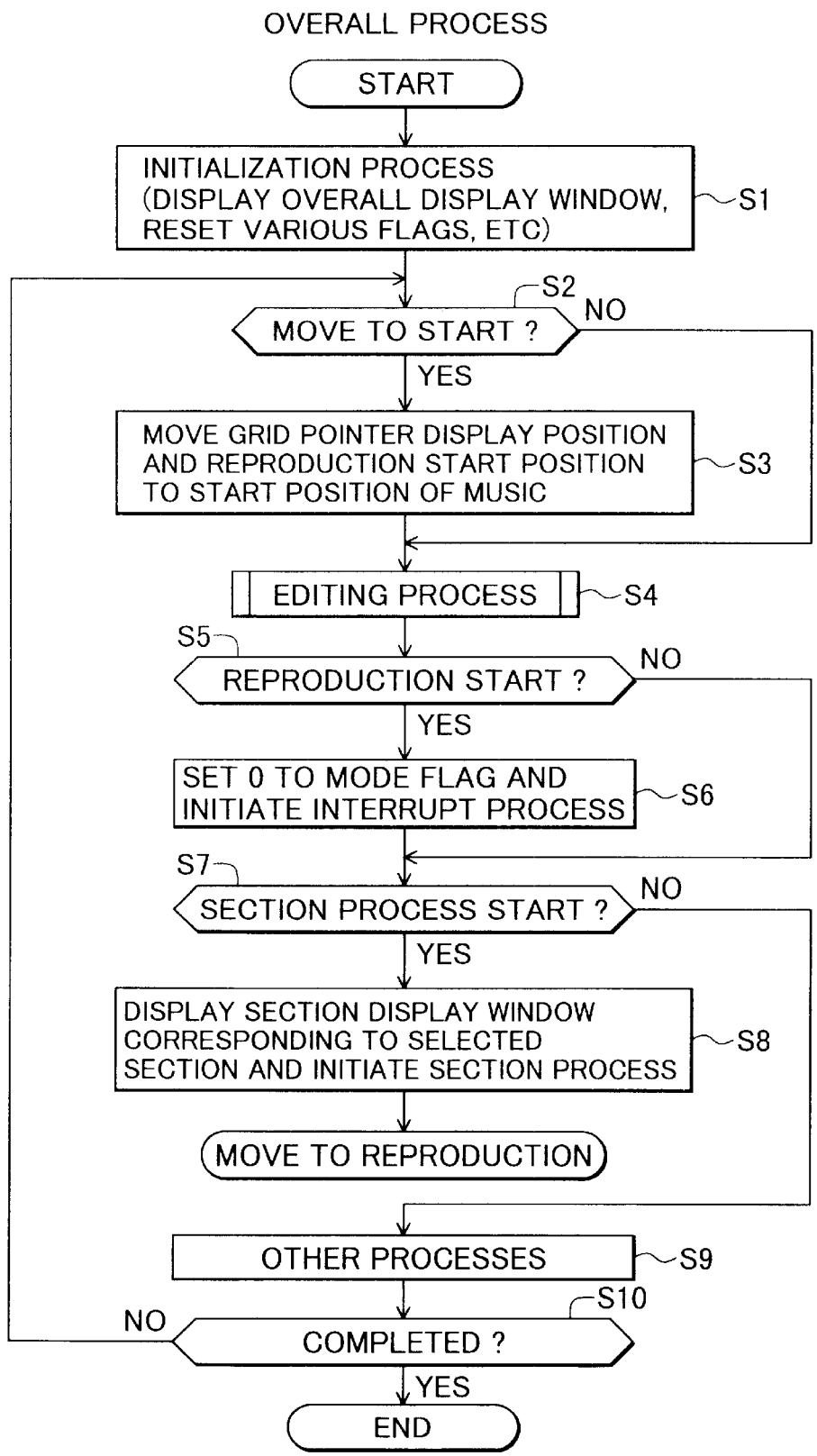
FIG. 9 is a flow chart illustrating an overall process according to the embodiment.

At Step S25 it is checked whether the overall display window W1 is selected (e.g., whether the mouse is clicked on the display window). If selected, at Step S26 the overall display window is displayed and the overall process shown in FIG. 9 is activated. In this manner, the overall process described earlier starts. If the overall process is not selected, other processes are executed at Step S27. It is checked at Step S28 whether the section process is completed. If not, the flow returns to Step S21, whereas if completed, the section process is terminated.

In the other processes at Step S27, the following processes are executed. In response to an activation of the fine rewinding switch SW4 or fast forward switch SW5, a process of changing the display position of the grid pointer GP and the reproduction start position to the designated position (the designated position can be moved from the front end to back end of a section). In response to an activation of the reproduction stop switch SW1, a stop process is executed to mute sounds and execute the interrupt process. In response to an activation of the end position change switch SW6, the display position of the grid pointer GP and the reproduction start position are changed to the back end of the section. Various editing processes are also executed for tone events in the section.

The interrupt process shown in FIG. 12 is activated when a reproduction start is instructed. The interrupt process is sequentially executed in response to an interrupt signal output from the timer 4 and in accordance with the presently set tempo. First, at Step S31 data of the process event at the present timing is read from the performance data. At Step S32 it is judged whether the MODE flag is 0 and the position is at the end of music. If this judgment is YES, at Step S33 sound reproduction and the interrupt process are stopped to return to the original routine. This process corresponds to the case that the overall process instructs a reproduction start and music is reproduced to the end thereof as shown in FIG. 6B.

If the judgement at Step S32 is NO, then at Step S34 it is judged whether the MODE flag is 1 and the position is at the back end of the section. If this judgement is YES, the process similar to that at Step S33 is executed to thereafter return to the original routine. This process corresponds to the case that the section process instructs a reproduction start (if the section is selected) and music is reproduced to the back end of the section as shown in FIG. 7B. If the judgement at Step S34 is NO, then at Step S35 the read event is processed to thereafter return to the original routine. The process at Step S35 reproduces sounds of tone events, mutes sounds of tone events, takes rests of tone events, or performs other controls.

In the embodiment, as the block is elongated or shortened, only the section partitioning position is moved. Instead, as the block is elongated or shortened, the contents of the block may be rewritten. For example, for the elongated block, the performance data in the original block may be repetitively recorded in amount corresponding to the elongated length. For the shortened block, the performance data in the original block may be deleted in amount corresponding to the shortened length. For the deleted block, the performance data in the original block may be deleted.

Obviously the performance data may be made of a plurality of parts. In this case, each of the plurality of parts may be independently processed in the manner described above, or if one part is processed in the manner described above, corresponding positions of the other parts may be edited in association with the processed part.

Although the reproduction is stopped at the end of music or at the back end of a section, after the music or section is reproduced to its end or back end, the reproduction may be resumed from the start of the music or from the front end of the section.

The block length may be a measure unit or any arbitrary length.

Figure 14:
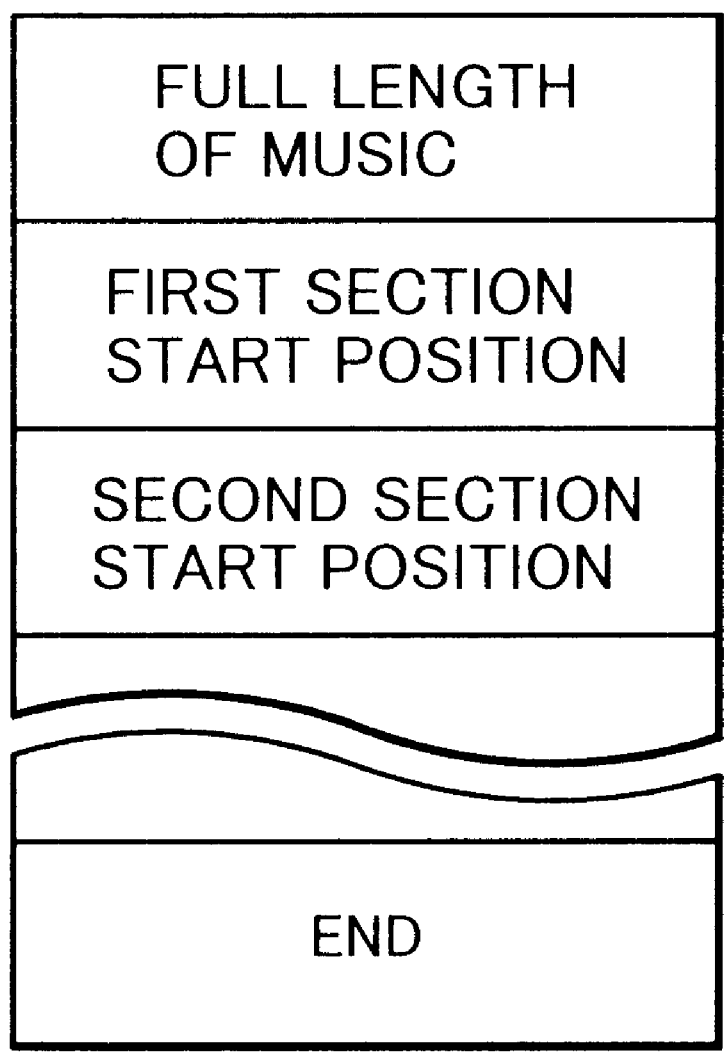
FIG. 14 is a diagram showing another example of data representative of a section partitioning position.

Also in the embodiment, although data of a section event is inserted into performance data, as shown in FIG. 14, data representative of section partitioning positions of performance data (e.g., first section start position, second section start position, . . . ) sequentially recorded may be registered in correspondence with the performance data. In this case, as the data representative of a section start position, timing data at the section start position, an address of a tone event at the start position or the like may be stored.

The embodiment described above is structured by a personal computer and software. The embodiment may be applied to an electronic musical instrument. In this case, the electronic musical instrument is not limited only to a keyed instrument, but it may be of a stringed instrument type, a wind instrument type, a percussion instrument type, and the like. The embodiment described above may also be applied to an automatic performance piano. The electronic musical instrument may be a discrete device such as a tone generator, a sequencer and an effector, or a system having such devices interconnected via communication means such as MIDI and various networks.

The format of performance data may be any type such as "event+relative time" which uses a lapsed time from the previous event, i.e. one event before the present event as the occurrence time of a performance event, "event+absolute time" which uses an absolute time in a program or measure as the occurrence time of a performance event, "pitch (rest)+absolute time" which uses a tone pitch and length or a rest and length for representing performance data, and "direct format" which provides a memory area of each set of performance data in the minimum performance resolution unit and stores the performance data in the memory area corresponding to the occurrence time of the performance event.

In the embodiment described above, the performance data editing program is stored in a hard disc of the external storage unit 5. This program may be stored in ROM 2 particularly in the case of an electronic musical instrument or the like. A floppy disc, a CD-ROM, an MO disc or the like of the external storage unit 5 may also be used. In this case, new installation, addition, version-up and the like of the performance data editing program can be performed with ease. The performance data editing program may be stored in a floppy disc, a magneto optical disc (MO) or the like.

The communication interface 8 and MIDI interface 9 may be a generally used interface such as RS-232C, universal serial bus (USB) and IEEE1394.

The present invention has been described in connection with the preferred embodiments. The invention is not limited only to the above embodiments. It is apparent that various modifications, improvements, combinations, and the like can be made by those skilled in the art.

I claim:

1. A method of editing musical performance data capable of editing performance data of music in each section among a plurality of sections of the music, comprising the steps of:
   displaying display elements each having a configuration corresponding to a time length of each of a plurality of sections contiguous in a time domain, on a display window, the display elements being sequentially coupled to each other on the display window;
   changing the configuration of a selected display element and the configuration of an adjacent display element;
   editing time lengths of a section and an adjacent section of performance data of music, corresponding to said selected and adjacent display elements, in accordance with change amounts of the configurations of the display element.

2. The method of editing musical performance data according to claim 1 wherein, in said changing step, an end of the selected display element is pointed and moved on the display window to move at the same time the end and an end of a display element adjacent to the end of the selected display element and change lengths of both the display elements.

3. The method of editing musical performance data according to claim 1, wherein, in said changing step, an end of the selected display element is pointed and moved on the display window to move at the same time the end and an end of a display element adjacent to the end of the selected display element and change lengths of both the display elements, and if the selected display element includes therein a whole of an adjacent display element, the included display element is deleted and a length of a next adjacent display element is also changed.

4. A musical performance data editing apparatus capable of setting a present position of performance data of music on a time axis and capable of editing the performance data of the music in each section among a plurality of sections of the music, comprising:
- a memory capable of storing the performance data;
- a display unit capable of displaying each section of the music;
- an operator capable of designating each section of the music on said display unit;
- an editor capable of editing the performance data associated with the designated section of the music;
- a present position change switch for changing the present position in the music; and
- a controller for, when said present position change switch is operated, setting the present position to an end position of a whole of the music if the section has not been designated, or if a section has been designated, setting the present position to an end position of the designated section.

5. A musical performance data editing apparatus capable of editing performance data of music in each section among a plurality of sections of the music, comprising:
- a memory capable of storing the performance data;
- a display unit capable of displaying each section of the music;
- an operator capable of designating each section of the music on said display unit;
- an editor capable of editing the performance data associated with the designated section of the music;
- a reproduction start switch; and
- a controller for, when said reproduction start switch is operated, reproducing the performance data to an end of the music if the section is not designated, or if a section is designated, reproducing the performance data of the designated section to a back end of the section.

6. A musical performance data editing apparatus capable of setting a present position of performance data of music on a time axis and capable of editing the performance data of the music in each section among a plurality of sections of the music, comprising:
- a memory capable of storing the performance data;
- a display unit capable of displaying each section of the music;
- a first operator capable of designating each section of the music on said display unit;
- an editor capable of editing the performance data associated with the section of the music designated by the first operator;
- a second operator capable of designating the present position in the music on said display unit; and
- a controller capable of displaying information of the present position as information of a position in a section including the present position.

7. A musical performance data editing apparatus capable of editing performance data of music in each section among a plurality of sections of the music, comprising:
- a memory capable of storing the performance data;
- a display unit capable of displaying each section of the music;
- a first operator capable of designating each section of the music on said display unit;
- an editor capable of editing the performance data associated with the section of the music designated by the first operator;
- a second operator capable of inputting new setting information; and
- a controller for, when the setting information is input after the section is designated, recording the setting information at a position before a first tone event in the designated section.

8. The musical performance data editing apparatus according to claim 7, wherein the setting information is tone color information.

9. The musical performance data editing apparatus according to claim 7, wherein said controller displays on the display and stores one piece of the input setting information in correspondence with one designated section.

10. A musical performance data editing apparatus capable of editing performance data of music in each section among a plurality of sections of the music, comprising:
- a memory capable of storing the performance data;
- a display unit capable of displaying display elements each having a configuration corresponding to a time length of each of a plurality of sections contiguous in a time domain, on a display window;
- an operator capable of designating each display element on said display unit and indicating to change the configuration of the designated display element;
- an editor for editing the time length of the performance data associated with the designated display element, in response to the indication of change by said operator; and
- a controller for displaying a partitioning position information at a position corresponding to a partitioning position of the display element before alteration of the configuration thereof.

11. A musical performance data editing method capable of setting a present position of performance data of music on a time axis and capable of editing the performance data of the music in each section among a plurality of sections of the music, by using a musical performance data editing apparatus comprising: a memory capable of storing the performance data; a display unit capable of displaying each section of the music; an operator capable of designating each section of the music on the display unit; an editor capable of editing the performance data associated with the designated section of the music; an operator capable of designating the present position in the music on the display unit; and a present position change switch for changing the present position in the music, the method comprising the steps of:
- setting an editing process; and
- when the present position change switch is operated, setting the present position to a start of a whole of the music if the section has not been designated, or if a section has been designated, setting the present position to a position associated with the designated section.

12. A musical performance data editing method capable of editing performance data of music in each section among a plurality of sections of the music, by using a musical performance data editing apparatus comprising: a memory capable of storing the performance data; a display unit capable of displaying each section of the music; an operator capable of designating each section of the music on the display unit; an editor capable of editing the performance data associated with the designated section of the music; an operator capable of designating the present position in the music on the display unit; and a reproduction start switch, the method comprising the steps of;
- setting an editing process; and
- when the reproduction start switch is operated, reproducing the performance data to an end of the music if the section is not designated, or if a section is designated, reproducing the performance data of the designated section to a back end of the section.

13. A musical performance data editing method capable of setting a present position of performance data of music on a time axis and capable of editing the performance data of the music in each section among a plurality of sections of the music, by using a musical performance data editing apparatus comprising: a memory capable of storing the performance data; a display unit capable of displaying each section of the music; a first operator capable of designating each section of the music on the display unit; an editor capable of editing the performance data associated with the section of the music designated by the first operator; a second operator capable of designating the present position in the music on the display unit; and a reproduction start switch, the method comprising the steps of:

setting an editing process; and displaying information of the present position as information of a position in a section including the present position.

14. A musical performance data editing method capable of editing performance data of music in each section among a plurality of sections of the music, by using a musical performance data editing apparatus comprising: a memory capable of storing the performance data; a display unit capable of displaying each section of the music; a first operator capable of designating each section of the music on the display unit; an editor capable of editing the performance data associated with the section of the music designated by the first operator; and a second operator capable of inputting new setting information, the method comprising the steps of:

setting an editing process; and when the setting information is input after the section is designated, recording the setting information at a position before a first tone event in the designated section.

15. A musical performance data editing method capable of editing performance data of music in each section among a plurality of sections of the music, comprising the steps of:

displaying display elements each having a configuration corresponding to a length of each of the plurality of sections contiguous in a time domain, on a display window, the display elements being sequentially coupled to each other on the display window;

designating a display element and indicating to change the configuration of the designated display element;

editing the time length of the performance data associated with the designated display element, in response to the indication of change; and displaying a partitioning position information at a position corresponding to a partitioning position of the display element before alteration of the configuration thereof.

16. A musical performance data editing program to be executed by a computer and being capable of editing performance data of music in each section among a plurality of sections of the music, the program comprising the procedures of:

displaying display elements each having a configuration corresponding to a time length of each of a plurality of sections contiguous in a time domain, on a display window, the display elements being sequentially coupled to each other on the display window;

changing the configuration of a selected display element and the configuration of an adjacent display element; and editing time lengths of a section and adjacent section of performance data of music, corresponding to said selected and adjacent display elements, in accordance with change amounts of the configurations of the display element.

17. A musical performance data editing program to be executed by a computer and being capable of setting a present position of performance data of music on a time axis and capable of editing the performance data of the music in each section among a plurality of sections of the music, the program comprising the procedures of:

displaying each section for designation by an operator;

when a section has been designated, editing, editing the performance data associated with the designated section of the music;

when a present position change switch is operated, setting the present position to a start of a whole of the music if the section has not been designated; and setting the present position to a position associated with a section if the section has been designated.

18. A musical performance data editing program to be executed by a computer and being capable of editing performace data of music in each section among a plurality of sections of the music, the program comprising the procedures of:

displaying each section for designation by an operator;

when a section has been designated, editing the performance data associated with the designated section of the music;

when a reproduction start switch is operated, reproducing the performance data to an end of the music if the section is not designated; and reproducing the performance data of a section to a back end of the section if the section is designated.

19. A musical performance data editing program to be executed by a computer and being capable of setting a present position of performance data of music on a time axis and capable of editing the performance data of the music in each section among a plurality of sections of the music, the program defining a musical performance data editing system providing a display capable of displaying each section of the music; a first operator capable of designating each section of the music on the display; an editor capable of editing the performance data associated with the section of the music designated by the first operator; a second operator capable of designating the present position in the music on the display, the program comprising the procedures of:

displaying each section for designation by an operator;

when a section has been designated, editing the performance data associated with the designated section of the music; and displaying information of the present position as information of a position in a section including the present position.

20. A musical performance data editing program to be executed by a computer and being capable of editing performance data of music in each section among a plurality of sections of the music, the program comprising the procedures of:

displaying each section for designation by an operator;

when a section has been designated, editing the performance data associated with the designated section of the music; and when the selling information is input after the section is designated, recording the setting information at a position before a first tone event in the designated section.

21. A musical performance data editing program to be executed by a computer and being capable of editing performance data of music in each section among a plurality of sections of the music, the program comprising the procedures of:

displaying display elements each having a configuration corresponding to a time length of each of the plurality of sections contiguous in a time domain, on a display window;

designating a display element, and indicating to change the configuration of the designated display elements;

editing the time length of the performance data associated with the designated display element, in response to the indication of change; and displaying a partitioning position information at a position corresponding to a partitioning position of the display element before alteration of the configuration thereof.

22. A musical performance data editing apparatus for editing performance data of music divided in a plurality of sections, in each section, comprising:

a display for displaying display elements corresponding to sections of music contiguous on time domain, each of said display elements having a configuration corresponding to time length of an associated section, the display elements being connected contiguously;

an operator capable of indicating change of the configuration of a selected display element on said display, thereby changing the configuration of the selected display element, and configuration of an adjacent display element; and an editor for editing time lengths of a section associated with the selected display element and of a section associated with said adjacent display element, in accordance with amount of change of the display elements.

23. The musical performance data editing apparatus according to claim 20, wherein said operator can select a display element, point and move an end of the selected display element, together with an end of an adjacent display element adjacent to the pointed end of the selected display element, thereby changing lengths of both the display elements.

24. The musical performance data editing apparatus according to claim 23, wherein when the selected display element comes to include whole of said adjacent display element, said display deletes the adjacent display element, and the operator can move an end of a next adjacent display element which comes adjacent to the pointed end.

* * * * *

UNITED STATES PATENT AND TRADEMARK OFFICE
CERTIFICATE OF CORRECTION

PATENT NO. : 6,635,816 B2
DATED : April 19, 2001
INVENTOR(S) : Funaki

It is certified that error appears in the above-identified patent and that said Letters Patent is hereby corrected as shown below:

Column 18,
Line 1, after "and" insert -- an --

Column 20,
Line 30, "20" should be -- 22 --

Signed and Sealed this

Twenty-seventh Day of April, 2004

JON W. DUDAS
*Acting Director of the United States Patent and Trademark Office*